April 18, 1944.  E. W. BENNISON  2,346,647
WELL SCREEN
Filed Nov. 28, 1940  2 Sheets-Sheet 1
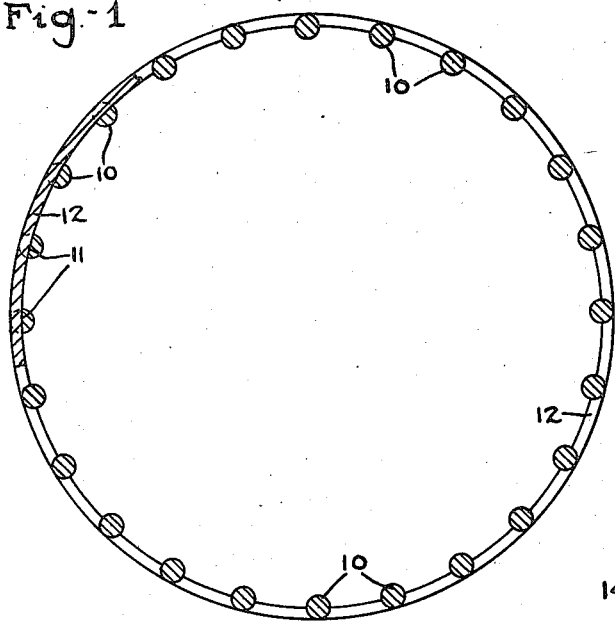
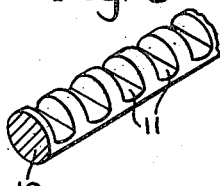
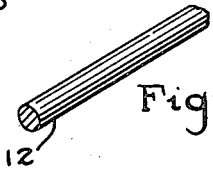
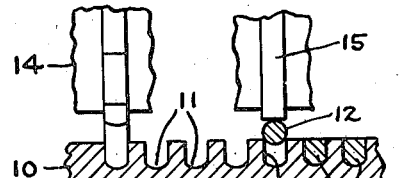
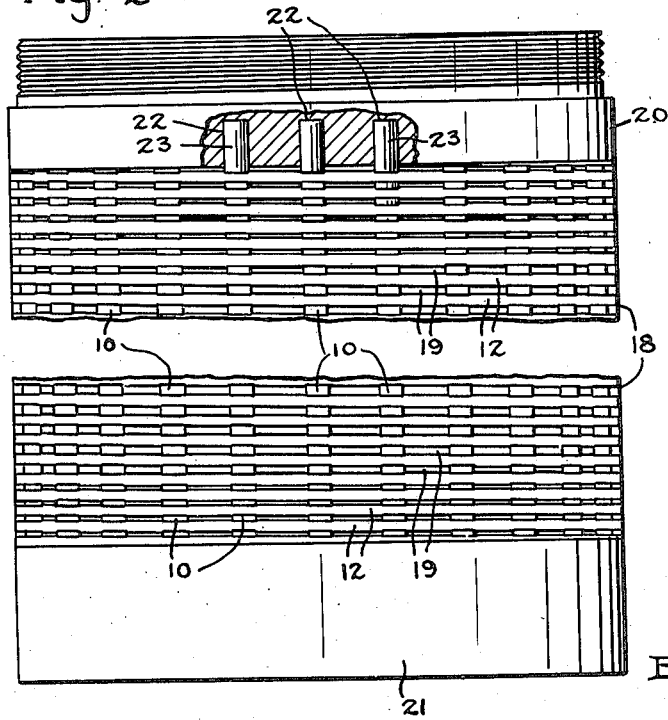
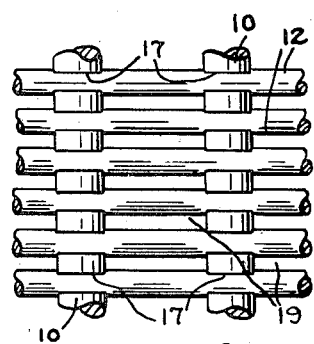
Inventor:
E. W. Bennison.
By *f. a. Whiteley*
Attorney April 18, 1944.  E. W. BENNISON  2,346,647
WELL SCREEN
Filed Nov. 28, 1940  2 Sheets-Sheet 2
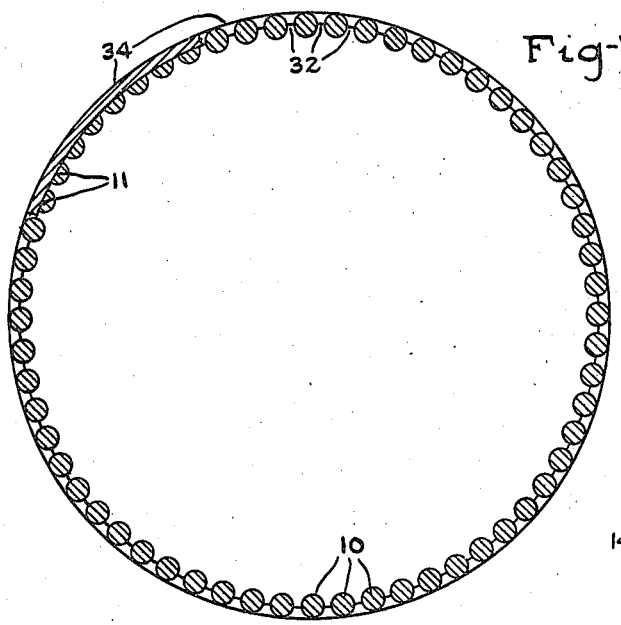
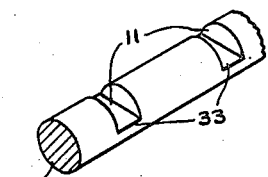
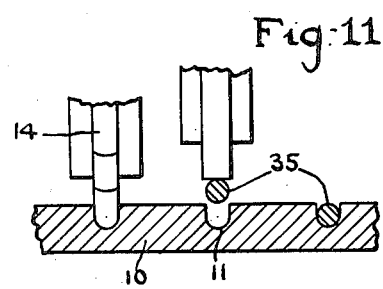
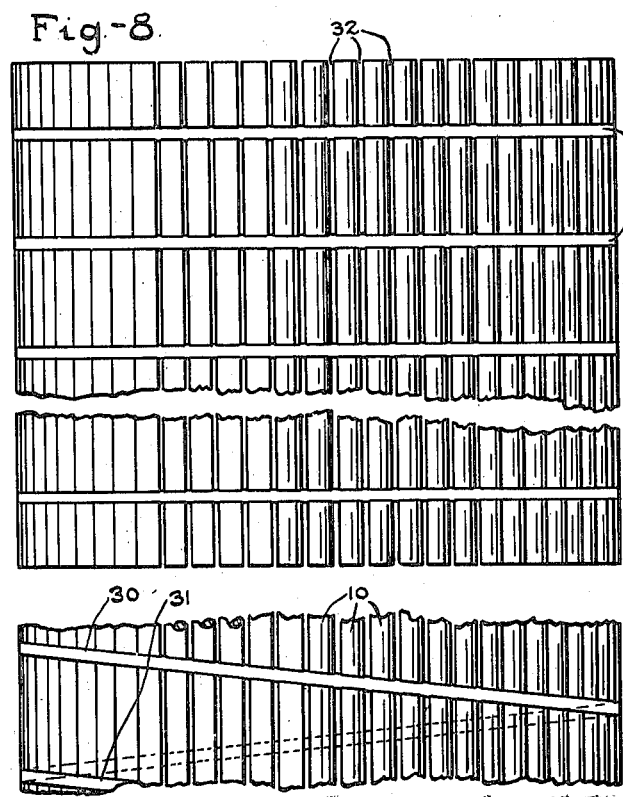
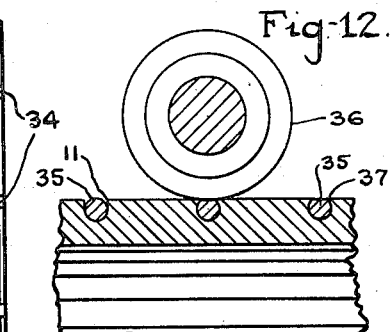
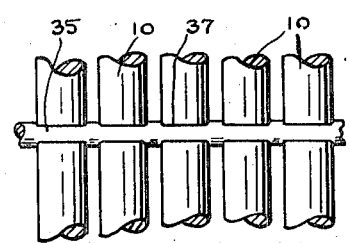
Inventor:
E. W. Bennison
By Attorney Patented Apr. 18, 1944

2,346,647

UNITED STATES PATENT OFFICE 2,346,647

WELL SCREEN

Ernest W. Bennison, St. Paul, Minn., assignor to Edward E. Johnson, Incorporated, St. Paul, Minn.

Application November 28, 1940, Serial No. 367,533

3 Claims. (Cl. 166—8)

My invention relates to well screens and has for its principal object to provide an efficient and durable screen with either circumferential or longitudinal drainage slots which can be manufactured at a minimum cost with the employment of low priced labor, and which will give a high degree of satisfaction for use in certain types of wells.

In the practice of manufacturing well screens it has been customary to hold a series of rods or longitudinal supporting members in parallel relation so that their outer limits outline a cylinder and to wind upon and in contact with said outer limits a wire laid in a progressive helix and spaced apart so that the distances between successive helical coils provide drainage slots to the interior of the resulting structure. The longitudinal rods and the helical wire are caused to be integrally united by successively heating electrically the wire and rods at their contacting portions whereby the adjacent metal of each is softened and they are caused to merge one within the other predetermined distances. There are certain difficulties in producing the above type of screen which require somewhat complicated mechanism and very accurate control of the flow of current for producing exactly the right degree of softening of the contacting parts of rods and helical wire so that the sinking together will be uniform and result in a screen having its outer limits falling in a uniform plane. Circumferential supporting members and longitudinal elements or rods have in the past been similarly united wherein the circumferential elements were more widely spaced and the longitudinal elements closely spaced to provide screening slots between longitudinal elements.

It is an object of my invention to unite circumferential and longitudinal elements of a well screen by a process of semi-welding or forging which avoids the difficulties of exact heating, and to produce the sinking together of rods and circumferential supporting elements by means which operate positively and certainly and are not dependent upon an exact degree of heat at any time generated by electric welding apparatus.

In carrying out my invention I provide longitudinal rods or supporting elements of sufficient mass so that when transverse grooves are cut to a depth of to or past the central plane of the rods, the rods will still be strong enough when the helically wound wire is united therewith to form a rigid unyielding well screen structure.

In forming the screen preferably I cut the grooves across the rods in synchronism with the winding of the helical wire so that the grooves all lie in the path of the helix formed by the winding of the wire.

It is a further object of my invention to wind the wire in the form of a helix overlying the grooves cut transversely across the rods and to simultaneously apply a welding electrode to the wire whereby the metal of the wire is softened and caused to flow and the wire is forced into the groove filling the groove and becoming substantially integral with its side walls.

It is therefore a principal object of my invention to provide a well screen wherein the longitudinal rods outline a cylinder and have formed therein a series of transverse grooves falling in a predetermined helix with a helically wound wire of normally greater diameter than the width of said grooves lying in said grooves and being narrowed within the grooves to seat therein and being forged into the sides and upper edges of said grooves.

It is a further object of my invention to provide a well screen the manufacture of which is effected in the same manner wherein the helical coils of the helix of wire will be relatively widely spaced and the longitudinal members will be spaced close together to provide a multiplicity of vertical drainage slots.

It is a further object of my invention to provide a well screen wherein the longitudinal elements are spaced close together to form vertical drainage slots, and wherein hoops or loops of metal are employed for binding the screen members together rather than a helix of wire.

It is a further object of my invention to provide a novel means of forging or caulking the crossing portions of longitudinal rods and circumferential supporting members to unite the two substantially integrally together.

It is to be understood that the term "rods" as used in this application, means round rods or rods of circular cross-section; and the term "wire" as used herein means round wire or wire of circular cross-section, as clearly shown in the drawings, and it is an object of my invention to provide a well screen wherein such normal round shapes are united to form a cylindrical well screen structure having either the rods or the wires suitably spaced to produce drainage slots of a predetermined or desired width.

The full objects and advantages of my invention will appear in connection with the detailed description thereof and its novel features by which the above noted advantageous results are obtained are particularly pointed out in the claims.

In the drawings illustrating an application of my invention in one form:

Fig. 1 is a transverse sectional view of a well screen made in accordance with my invention.

Fig. 2 is a plan view of such a screen with parts broken away and in section.

Fig. 3 is a perspective view of a portion of a supporting rod after grooves have been cut therein.

Fig. 4 is a perspective view of the wire which is to be wound in a helix over the transverse grooves of the supporting rods.

Fig. 5 is a diagrammatic showing of the manner in which the grooves are cut and the wire as laid is subject to the action of a weighted electrode.

Fig. 6 is an enlarged plan view showing the form of union of wire and rod for forming vertical slots.

Fig. 7 is a transverse sectional view of a well screen made in accordance with my invention wherein the circumferential elements are the supporting members and the longitudinal elements form the drainage slots.

Fig. 8 is a plan view of the screen shown in Fig. 7.

Fig. 9 illustrates the manner in which spaced helical coils provide support for the longitudinal elements forming drainage slots of Figs. 7 and 8.

Fig. 10 is an enlarged scale perspective view of one of the longitudinal rods showing wide spacing for the circumferential elements.

Fig. 11 is a view similar to Fig. 5 showing how grooves are cut and wire laid for a modified form of forging or caulking.

Fig. 12 is a part sectional diagrammatic view showing the manner in which the forging or caulking is effected.

Fig. 13 is an enlarged plan view showing how the vertical rods have portions forged down over the supporting wires to hold the circumferential and vertical elements united.

In forming my screen a multiplicity of longitudinal supporting rods 10 are held by any suitable means (not shown) equally spaced and so that their outer limits fall within the limits of a cylinder outlined by said outer limits. Each of these rods 10 is adapted to be formed with transverse grooves 11, as shown in Fig. 3. The grooves extend in lines about the cylinder of rods which comprise a helix as clearly indicated in Fig. 2.

Also in Fig. 2, a helix of wire 12 is laid in the grooves. This wire 12 is normally of greater diameter than the width of the grooves, as indicated at 13 of Fig. 5. Preferably in forming the screen the grooves 11 are cut along a helical line at the same time that the wire 12 is successively laid in the form of a helix over said grooves 11. A cutter 14 of any suitable type driven by means not shown is indicated in Fig. 5. A welding disc 15 supplied with welding current in a suitable manner and sufficiently weighted rides upon the wire 12 as it is wound over the grooves 13. At each contacting point of the wire and the upper edges of the grooves a circuit is completed through a section of the wire 12 to the rod 10 in a known manner with the result that the metal of rod 12 is heated sufficiently to make the section above the groove fluid or semi-fluid and the weight of the weighted electrode 15 will thus cause the section of wire 12 to be forced down into grooves 11, as indicated at 16 in Fig. 5.

There thus will be formed flattened portions 17 of the wire 12 held between the side walls of grooves 11 and integrated therewith in a manner of welding by the cooling of the contacted fluid metal. This structure results in a completed screen 18, as shown in Fig. 2. In this manner the rods 10 and the helix formed of the wire 12 will be integrated and united together to provide an unusually strong and rigid well screen construction wherein drainage slots 19 are formed between successive pairs of rods 10 and successive helical coils of the wire 12.

As shown in Figs. 7, 9 and 10, the spiral coils indicated at 30 and 31 may be widely spaced and the vertical rods 10 may be spaced close together so as to leave openings 32 of the right width to provide drainage slots extending vertically from end to end of the screen. In such a case the notches 11 in the rods 10 will be widely spaced, as indicated at 33, but otherwise the construction of the well screen will be the same as in Figs. 1 to 6. Of course in this form where the helical coils 30 and 31 are laid the wide spacing will be effected by relatively rapid advancement of the rods 10 as the wire 12 is laid thereon. In this case the transverse slots will still be cut, as the wire 12 is laid and forged into the transverse slots 11 in the manner indicated diagrammatically in Fig. 5.

As shown in Fig. 8 the well screen embodying vertical members, such as rods 10, spaced close together to provide narrow vertical drainage slots 32 may be fabricated in which the circumferential elements comprise closed hoops, rings or bands 34 which lie in the transverse slots 11 and hold the vertical elements in position. In this case the slots 11 will be cut in circles about the group of rods and after the slots have been cut the rings will be applied to the several rows of slots to complete the screen.

Cylindrical fittings 20 and 21 are formed with circular rows of holes 22, as shown in Fig. 2. These holes 22 receive ends 23 of the rods 10 which have not been grooved or had applied thereto the helix formed of wire 12. The rod ends 23 are united integrally by welding or other means with the body of the fittings 20 and 21 within the holes 22.

There thus is formed a completed well screen wherein a multiplicity of longitudinal supporting rods have secured within transverse grooves across said rods a helically wound wire of a normal diameter greater than the width of the grooves, said wire being everywhere seated within said grooves and forged and welded to the walls thereof.

A modified way of performing this forging operation is shown in Figs. 11 to 13. As there illustrated, the cutter 14 may operate as in connection with the formation of the screen of Figs. 1 to 6, but the wire 35 is of a diameter to fit fully within the transverse slots 11 in rods 10. After the parts have been fully assembled a welding disc 36 is run successively along the rods 10. As current is passed therefrom through wires 35 it results in softening and forging over the metal of the rods, as indicated at 37, Figs. 12 and 13.

The advantages of my invention have been made to appear in the foregoing specification. A primary advantage resides in the fact that an efficient, practical well screen can be made very cheaply either with longitudinal or helical drainage slots and when completed has a strong union between circumferential and longitudinal elements which is effected by simple and practical means and wherein the depth of sinking together of longitudinal and circumferential elements is such that in practice the entire body of circumferential elements will be sunk within the body of the longitudinal elements.

I claim:

1. A well screen comprising sets of longitudinal and circumferential members, the members of each set being circular in cross-section, the members of one set being closely spaced to form drainage slots, the members of the other set being widely spaced to form supports for the closely spaced set, the longitudinal members being provided with sets of aligned transverse parallel-walled grooves, the set of circumferential members having the portions within said grooves narrower than the normal transverse extent thereof and being held to unite the two sets of members into a rigidly interconnected structure by compression contact of side portions of the circumferential members with the sides of said grooves caused by forging the groove contacting portions of the circumferential members upon and against the side walls of said grooves.

2. A well screen comprising a multiplicity of longitudinally extended rods of circular cross-section whose outer limits outline a cylinder, said rods being positioned close together to form a series of vertical drainage slots, said rods being formed with aligned series of transverse parallel-walled grooves, spaced coils of wire of circular cross-section positioned in said grooves for supporting and holding the longitudinal elements to form a unitary structure, said coils of wire having the portions thereof within said grooves narrower than the normal diameter of the wire forming the coils, and being held to unite the two sets of elements into a rigidly interconnected structure by compression contact of side portions of the wires with the sides of said grooves caused by forging the groove-contacting portions of the coils of wire upon and against the side walls of said grooves.

3. A well screen comprising a multiplicity of longitudinal supporting rods of circular cross-section whose outer limits outline a cylinder, said rods being spaced substantial distances apart in parallel relation, said rods being formed with aligned series of transverse parallel-walled grooves, the grooves of the several rods falling in a continuous helix of closely spaced coils, a helix of wire of circular cross-section having its coils positioned in said grooves and so held closely spaced to form helical drainage slots, said helix of wire having the portions thereof within said grooves narrower than the normal diameter of the wire forming the coils and being held to unite the two sets of elements into a rigidly interconnected structure by compression contact of said side portions of the wires with the sides of said grooves caused by forging the groove contacting portions of the coils of wire upon and against the side walls of said grooves.

ERNEST W. BENNISON.